United States Patent
Barlos et al.

(10) Patent No.: US 7,351,771 B2
(45) Date of Patent: Apr. 1, 2008

(54) PROCESS FOR REGENERATING 2-CHLOROTRITYL RESINS

(75) Inventors: Kleomenis Barlos, Patras (GR); Bernhard Knipp, Kuerten-Olpe (DE)

(73) Assignee: Hoffmann-La Roche Inc., Nutley, NJ (US)

( * ) Notice: Subject to any disclaimer, the term of this patent is extended or adjusted under 35 U.S.C. 154(b) by 35 days.

(21) Appl. No.: 10/740,207

(22) Filed: Dec. 18, 2003

(65) Prior Publication Data

US 2004/0147717 A1 Jul. 29, 2004

(30) Foreign Application Priority Data

Dec. 20, 2002 (EP) ................... 02028744

(51) Int. Cl.
*C08F 8/20* (2006.01)
(52) U.S. Cl. ................ 525/355; 525/333.3; 525/333.4
(58) Field of Classification Search ................ 525/355, 525/333.3, 333.4
See application file for complete search history.

(56) References Cited

U.S. PATENT DOCUMENTS 2,725,368 A 11/1955 Reynolds

FOREIGN PATENT DOCUMENTS

| DE | 43 06 839 | 9/1994 |
|---|---|---|
| WO | WO 92/22591 | 12/1992 |
| WO | WO 01/85758 A2 | 11/2001 |

OTHER PUBLICATIONS

Youngman, et. al., THL (1997), 6347-6350.
Hoekstra, et. al., THL (1997), 2629-2632.
Barlos, et al., Int. J. Pep. Prot. Res 37 (1991) 513-520.
Barlos, et al., Liebigs A. (1988), 1079-1081.
Krchnak et al., THL (1997), 7299-7302.
Barlos, et al, THL (1989), 3943-3946.
Frechet, et al, Can. J. Chem. 54 (1976) 926-934.
Orosz, et al., THL (1998), 3241-3242.
React. Funct. Polym. 41 (1999) 111.
Z. Phy. Chem. 113 (1978) 199.

*Primary Examiner*—Elvis O. Price
(74) *Attorney, Agent, or Firm*—George W. Johnston; Patricia S. Rocha-Tramaloni

(57) ABSTRACT

The present invention relates to a recycling process for the preparation of solid phase bonded 2-chlorotrityl chloride (2-CTC resin) useful for solid phase peptide synthesis, wherein active chloride CTC resin is regenerated by reacting the spent resin with a chlorinating agent in organic solvent.

6 Claims, No Drawings

PROCESS FOR REGENERATING 2-CHLOROTRITYL RESINS

BACKGROUND OF THE INVENTION

Trityl resins are useful solid phase bonded protecting groups, originally developed for solid phase peptide synthesis and as well used for solid phase organic synthesis. Solid phase bonded 2-chlorotrityl chloride (2-CTC resin) is commercial available [CBL Patras] and based on crosslinked polystyrene (Ps) or modified polystyrenes (e. g. tentagel, polystyrene grafted with polyethyleneglycol) [1: catalog ACT, Noviabiochem]. The 2-CTC linker is an acid labile resin and because of its excellence properties playing a significant role in novel linker technology [2: THL 1997, 6347, 2629; Int. J. Pep. Prot. Res. 37 (1991) 513]. Cleavage of peptides from 2-CTC resin can be effected by treatment under very mild acidic conditions (e. g. dilute TFA/DCM, AcOH/DCM, HFIP) [1, 3: Liebigs A. 1988, 1079, THL 1997, 7299]. Despite being an expensive and a valuable synthetic tool, a simple, efficient, gentle, reproducible experimental description for the recycling of—in solid phase synthesis—"used 2-CTC resin" without any loss of activity is so far unknown in the literature.

To synthesize 2-CTC resin from the 2-chlorotriphenyl-carbinol resin (2-CT-OH resin), references are given to the experimental procedure of the parent tritylchloride resin from the triphenylmethanol resin in an analogous manner [4: THL 1989, 3943; Can. J. Chem. 54 (1976) 926] or more detailed [1, 5: THL 1998, 3241; 6: React. Funct. Polym. 41 (1999) 111].

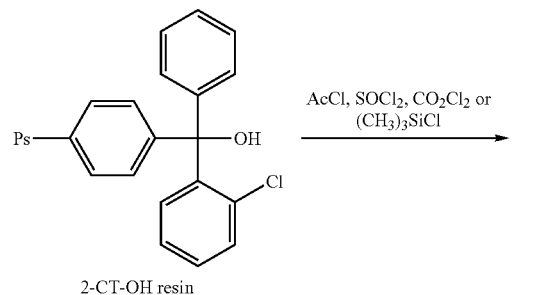

2-CT-OH resin

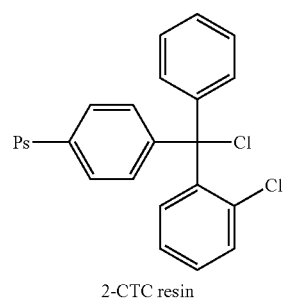

2-CTC resin

WO 01/85758 A2 [7] discloses the recycling of carboxylic acid (e.g. preferably trifluoroacedic acid) trityl ester resins with HCl in $CH_2Cl_2$. Apart of the fact that trifluoroacedic acid trityl esters are subject to hydrolysis [8: Z. Phy. Chem. 113 (1978) 199] and therefore difficult to handle, the reexamination of the example given in [7] achieved only 77% of the content of active chloride [6] before use.

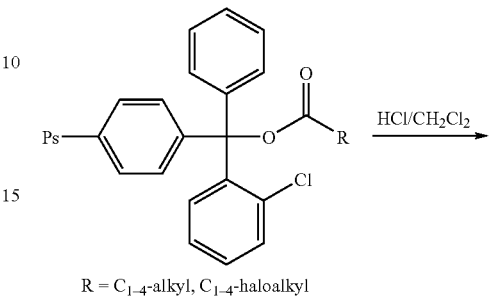

$R = C_{1-4}\text{-alkyl}, C_{1-4}\text{-haloalkyl}$

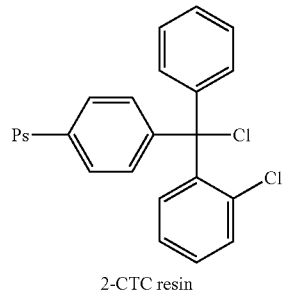

2-CTC resin

After loading of 2-CTC resin with Fmoc-amino acids, unreacted active sites are end-capped with alcohols, especially methanol and Fmoc protecting groups are deprotected with amines, especially piperidine [1, 9: W. C. Chan, P. D. White in Fmoc Solid Phase Peptide Synthesis] leading to a certain amount of methylether and amine substructures in the resin. These substructures decrease the yield of the recycling step and consequently the activity (content of active chloride) of the recycled resin.

SUMMARY OF THE INVENTION

Surprisingly it has now been found, that by carrying out a reaction of used 2-CTC resin (comprising of a compound of formula II) in the presence of a chlorinating agent and an organic solvent, the active chloride content of the recovered 2-CTC resin can be successfully regenerated. Further it has been found that such recycling of "used resin" takes place approximately quantitatively due to conversion of compound of formula II wherein R is as defined below to 2-CTC resin. The recycled 2-CTC resin loaded successful Fmoc-Trp(Boc) or Fmoc-Leu [9: p. 217]. It was found that chlorination with HCl in the presence of an organic solvent is also applicable for the conversion of 2-CT-OH resin to 2-CTC resin.

DETAILED DESCRIPTION OF THE INVENTION

The present invention describes a process for the preparation of solid phase bonded 2-chlorotrityl chloride (2-CTC resin) of formula I

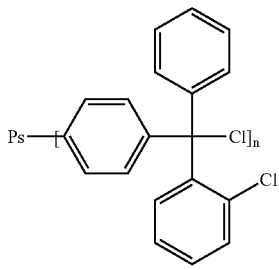

wherein Ps is a polymeric support and n has the following meaning: 1≧n>0 comprising the reaction of solid phase bonded 2-chlorotrityl of formula II

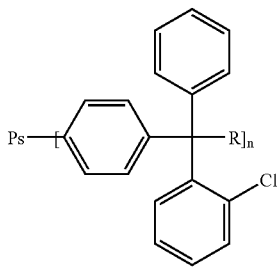

wherein R is OH or/and $OC_{1-4}$-alkyl or/and NR'R" (i.e. the resin as a whole may have bound to it any one of or a combination of such groups), wherein R' and R" independently of each other represent $C_{1-4}$-alkyl, or R' and R" together with the nitrogen to which they are bonded represent a 5 to 8 membered heterocyclic radical in the presence of a chlorinating agent and an organic solvent.

In further preferred embodiments the reaction is carried out wherein

R is OH, $OCH_3$, $OC_2H_5$, $OC_3H_7$, or

R' and R" independently of each other represent methyl, ethyl, or

R' and R" together with the nitrogen to which they are bonded represent piperidine.

Most preferred is the case wherein R is OH or/and $OCH_3$ or/and piperidine and the used resin is reacted in the presence of HCl and an organic solvent.

The term "polymeric support" within the present invention means polymeric resins suitable for use in solid phase synthesis, or surfaces in which polymers, having synthesis properties similar to these polymeric resins are attached to a solid support, or modified silica gels suitable for use in solid phase synthesis, preferably polystyrene (0-25% divinylbenzene crosslinked), more preferred 0-10% divinylbenzene crosslinked and most preferred 1% divinylbenzene crosslinked.

The term "solid phase bonded 2-chlorotrityl" within the present invention means 2-chlorotrityl bonded to the polymeric support as defined above.

The value "n" within the present invention has the following meaning: 1≧n>0, therefore the value "n" may be between 0 and 1, whereas 1 is included. In a preferred embodiment, the value "n" has the following meaning: 0.9≧n≧0.5.

The term "alkyl" as used herein denotes an optionally substituted straight or branched chain hydrocarbon residue containing 1 to 4 carbon atoms, such as methyl, ethyl, n-propyl, isopropyl, n-butyl, 1-sec-butyl, isobutyl and tert.-butyl. Preferably, the term "alkyl" denotes an optionally substituted straight or branched chain hydrocarbon residue containing 1 to 3 carbon atoms. More preferred the term "alkyl" denotes a methyl or ethyl group. Most preferred the term "alkyl" denotes a methyl group.

Within the present invention a compound of formula II wherein R is OH or/and $OC_{1-4}$-alkyl or/and NR'R" wherein R' and R" independently of each other represent $C_{1-4}$-alkyl, or R' and R" together with the nitrogen to which they are bonded represent a 5 to 8 membered heterocyclic radical (preferably wherein R is OH, $OCH_3$, $OC_2H_5$, $OC_3H_7$, dimethylamine, diethylamine, methylethylamine or/and piperidine; most preferred wherein R is OH or/and $OCH_3$ or/and piperidine) is used.

The ratio of OH and $OC_{1-4}$-alkyl and NR'R" maybe between 100:0:0 and 0:100:0 and 0:0:100. In a preferred embodiment the compound of formula II wherein R is OH is enriched.

Within the present invention 5 to 8 membered heterocyclic radicals for the term NR'R" are the following moieties: pyrrolidinyl, piperidinyl.

According to the present invention, "used resin" (formula II), obtained after peptide cleavage, e.g. in the case of the polypeptides T-20 or T-1249 [10: U.S. Pat. No. 5,464,933, 12: U.S. Pat. No. 6,258,782] and quenching with pyridine (traces of water) [13: JACS 80 (1958) 812], is recycled after washing (e.g. dioxane) in the presence of a chlorinating agent and an organic solvent. The carbinol substructure in "used resin" can be verified by IR-spectroscopy ($v_{OH}$=3566 $cm^{-1}$). Trace amounts of Methanol (evidence of minimum —$OCH_3$ content in "used resin") can be detected by GC in the filtrate of the recycling experiments and nitrogen content by elemental analysis of "used resin". The recycling reaction may be carried out in organic solvents: e. g. toluene, chlorobenzene, $CH_2Cl_2$, DMSO, NMP (1-metyl-2-pyrrolidinone), DMF, ethers or cyclic ethers with high absorption capacity of HCl gas (such as alkylethers, DME, Diglyme, THF or dioxane). The recycling reaction is preferably carried out in the presence of THF or dioxane, most preferred in the presence of dioxane.

Further, the recycling reaction may be carried out with chlorinating agents known from textbooks about organic chemistry (e.g. from J. March, "Advanced Organic Chemistry: Reactions, Mechanisms, and Structure", 4th ed. John Wiley & Sons(1992)) such as $PCl_5$, $PCl_3$, $POCl_3$, $SOCl_2$, $CH_3COCl$, $CO_2Cl_2$, $(CH_3)_3SiCl$ or HCl. Preferred chlorinating agents are $PCl_5$, $PCl_3$, $POCl_3$ or HCl, and most preferred chlorinating agent is HCl.

In a further embodiment, the present invention maybe carried out in a single percolation or in repetitive percolations.

In a preferred embodiment, the process is carried out with excess HCl.

The reaction may be carried out at a temperature between 0° C. and 110° C. preferably at a temperature between 0-50° C. and most preferred at a temperature between 10° C. and 25° C.

The reaction may be carried out in the organic solvent (preferred dioxane or THF, most preferred dioxane) wherein the HCl content is about 10-20 g/100 ml, most preferred >20 g/100 ml.

In a further embodiment of the invention, the reaction may be carried out in the organic solvent (preferred dioxane or THF, most preferred dioxane) wherein the HCl content is >0 to about 40 g/100 ml, preferably 10-35 g/100 ml, and most preferred 20-30 g/100 ml.

The reaction may be carried out for 6-96 h preferably for 17-96 h and most preferred for 21-24 h.

EXAMPLES

Procedure:

In a double-walled jacket reactor with glass frit bottom 5 g pure "used resin" (formula II) was—after pretreatment in the organic solvent and suction of the solvent—stirred slowly in the organic solvent with dissolved chlorinating agent at specified reaction temperature (T) for specified reaction time (t). After completion of the percolation and suction of the reaction solution the remaining resin was washed with the reaction solvent, treated with hexane and dried under vacuum at 35° C. The content of active chloride of the recycled 2-CTC resin (formula I) was determined [6] and its content of nitrogen by elemental analysis was below detection limit. In the examples set forth in Table 1, the virgin 2-CTC resin (formula I) had content of active chloride before use: ~1.27 mol/kg. The "used resin" (formula II) had no active chloride before use and the content of compound of formula II wherein R is $OC_{1-4}$-alkyl is between 0 and 5%, and the content of nitrogen is between 0 and 0.2%.

TABLE 1

| formular II R is | solvent | chlorinating agent | T [° C.] | t [h] | content of active chloride [mol/kg] |
|---|---|---|---|---|---|
| OH, OCH$_3$, piperidine | 80 ml toluene | 10 ml PCl$_3$ | 25 | 17 | 0.76 |
| OH, OCH$_3$, piperidine | 80 ml toluene | 10 ml PCl$_3$ | 50 | 17 | 0.75 |
| OH, OCH$_3$, piperidine | 80 ml toluene | 10 ml POCl$_3$ | 25 | 17 | 0.62 |
| OH, OCH$_3$, piperidine | 80 ml toluene | 10 ml SOCl$_2$ | 25 | 17 | 0.97 |
| OH, OCH$_3$, piperidine | 80 ml toluene | 10 ml SOCl$_2$ | 110 | 15 | 1.02 |
| OH, OCH$_3$, piperidine | 80 ml toluene | 10 ml CH$_3$COCl | 25 | 17 | 0.39 |
| OH, OCH$_3$, piperidine | 80 ml toluene | 10 ml CH$_3$COCl | 50 | 17 | 1.03 |
| OH, OCH$_3$, piperidine | 200 ml toluene | 10 g PCl$_5$ | 110 | 17 | 0.77 |
| OH, OCH$_3$, piperidine | 120 ml CH$_2$Cl$_2$ | 10 g PCl$_5$ | 25 | 17 | 1.22 |
| OH, OCH$_3$, piperidine | 80 ml CH$_2$Cl$_2$ | 10 ml SOCl$_2$ | 40 | 65 | 0.97 |
| OH, OCH$_3$, piperidine | 40 ml dioxane | 9.8 g HCl (24.5 g/100 ml) | 25 | 24 | 1.22 |
| OH, OCH$_3$, piperidine | 50 ml dioxane | 8.7 g HCl (17.4 g/100 ml) | 25 | 24 | 1.29 |
| OH, OCH$_3$, piperidine | 71 ml dioxane | 11.1 g HCl (15.6 g/100 ml) | 25 | 17 | 1.14 |
| OH, OCH$_3$, piperidine | 90 ml dioxane | 9.2 g HCl (10.2 g/100 ml) | 25 | 24 | 1.21 |
| OH, OCH$_3$, piperidine | 90 ml dioxane | 14 g HCl (15.6 g/100 ml) | 25 | 24 | 1.23 |
| OH, OCH$_3$, piperidine | 90 ml dioxane | 14 g HCl (15.6 g/100 ml) | 10 | 24 | 1.23 |
| OH, OCH$_3$, piperidine | 90 ml dioxane | 14 g HCl (15.6 g/100 ml) | 25 | 65 | 1.18 |
| OH, OCH$_3$, piperidine | 2x 90 ml dioxane | 2 × 14 g HCl (15.6 g/100 ml) | 25 | 2x 24 | 1.16 |
| OH, OCH$_3$, piperidine | 90 ml dioxane (no pretreatment) | 14 g HCl (15.6 g/100 ml) | 25 | 20 | 1.21 |
| OH, OCH$_3$, piperidine | 90 ml dioxane | 24.3 g HCl (27 g/100 ml) | 25 | 21 | 1.29 |
| OH, OCH$_3$, OC$_2$H$_5$, piperidine | 90 ml dioxane | 24.3 g HCl (27 g/100 ml) | 25 | 20 | 1.27 |
| OH, OCH$_3$, i-OC$_3$H$_7$ | 90 ml dioxane | 23 g HCl (25.5 g/100 ml) | 25 | 22 | 1.31 |
| OH | 90 ml dioxane | 18.9 g HCl (21 g/100 ml) | 25 | 24 | 1.6 |
| OH | 90 ml THF | 19.7 g HCl (21.9 g/100 ml) | 25 | 18 | 0.99 |
| OH | 90 ml THF | 31.1 g HCl (34.5 g/HCl) | 25 | 24 | 1.15 |

From the data presented in Table 1, it is clear that by carrying out the reaction according to the present invention active chloride is substantially regenerated in the recovered 2-CTC resin.

The invention claimed is:

1. A process for the preparation of solid phase bonded 2-chlorotrityl chloride (2-CTC resin) of formula I

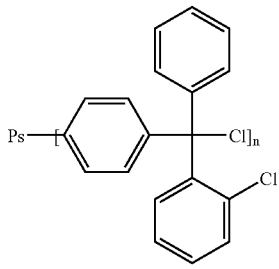

wherein Ps is a polymeric support and n has the following meaning: $1 \geq n > 0$ comprising the reaction of solid phase bonded 2-chlorotrityl of formula II

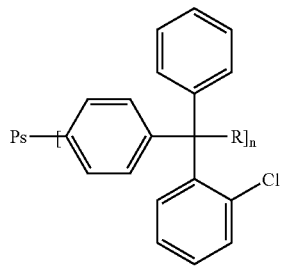

wherein R is OH or/and $OC_{1-4}$-alkyl or/and NR'R"

wherein R' and R" independently of each other represent $C_{1-4}$-alkyl, or R' and R" together with the nitrogen to which they are bonded represent a 5 to 8 membered heterocyclic radical in the presence of a HCl and dioxane.

2. The process according to claims 1 wherein n is $0.9 \geq n \geq 0.5$.

3. The process according to claim 1 wherein the reaction temperature is between 0 and 110° C.

4. The process according to claim 1 wherein the HCl content in dioxane is >0 to about 40 g/100 ml.

5. The process according to claim 1 wherein the reaction time is 6-96 h.

6. The process according to claim 1 wherein it is carried out in a single percolation or in repetitive percolations.

* * * * *